United States Patent [19]

Song

[11] Patent Number: 5,973,810
[45] Date of Patent: Oct. 26, 1999

[54] REMOTE-CONTROLLED MONITOR/PC CONTROL CIRCUIT AND CONTROL METHOD THEREOF

[75] Inventor: Moon-Jong Song, Suwon, Rep. of Korea

[73] Assignee: SamSung Electronics Co., Ltd., Suwon, Rep. of Korea

[21] Appl. No.: 08/959,071

[22] Filed: Oct. 28, 1997

[30] Foreign Application Priority Data

Oct. 28, 1996 [KR] Rep. of Korea ............. 96/49291

[51] Int. Cl.⁶ ................................................. H04B 10/00
[52] U.S. Cl. ................................. 359/142; 359/148
[58] Field of Search ................................. 359/142, 143, 359/144, 146, 147, 148; 340/825.69, 825.72, 825.24, 825.25

[56] References Cited

U.S. PATENT DOCUMENTS

| 4,808,992 | 2/1989  | Beyers et al. .......... 340/825.24 |
| 4,817,203 | 3/1989  | Tsurumoto et al. ......... 359/147 |
| 5,204,768 | 4/1993  | Tsakiris et al. ........... 359/148 |
| 5,457,478 | 10/1995 | Frank ..................... 345/158 |
| 5,563,630 | 10/1996 | Tsakiris et al. ........... 345/160 |
| 5,640,152 | 6/1997  | Copper ................. 340/825.54 |
| 5,774,063 | 6/1998  | Berry et al. .............. 359/148 |
| 5,782,548 | 7/1998  | Miyashita ................. 359/142 |

*Primary Examiner*—Rafael Bacares
*Attorney, Agent, or Firm*—Robert E. Bushnell, Esq.

[57] ABSTRACT

A remote-controlled PC body (mainframe) and monitor controlling circuit includes a remote controller for generating an optical remote control signal in according to a key input; an optical reception unit for converting the optical remote control signal output the remote controller into an electrical remote control signal; and a first microcomputer for controlling the PC body when the electrical remote control signal output the optical reception unit is a PC body control signal to control a sound output circuit and motion picture output circuit in the PC body and for controlling the monitor when an electrical remote control signal output the optical reception unit is a monitor control signal, to control Display Power Management System and On screen display functions.

6 Claims, 6 Drawing Sheets

REMOTE-CONTROLLED MONITOR/PC CONTROL CIRCUIT AND CONTROL METHOD THEREOF

CLAIM OF PRIORITY

This application makes reference to, incorporates the same herein, and claims all benefits accruing under 35 U.S.C. § 119 from an application for REMOTE-CONTROLLED MONITOR/PC CONTROL CIRCUIT AND CONTROL METHOD THEREOF earlier filed in the Korean Industrial Property Office on the 28 th of October 1996 and there duly assigned Ser. No. 49291/1996.

FIELD OF THE INVENTION

The present invention relates to a monitor and PC control circuit using a remote controller and a control method thereof and, more particularly, to such a circuit and method in which a monitor and PC mainframe are remotely controlled via a microcomputer located in the monitor.

DISCUSSION OF RELATED ART

Though electronic products are now widely equipped with remote controllers, personal computers (PCs) have for the most part remained manually controlled. A remote controller has, however, been developed which can control the computer body but does not provide for monitor control. That is, the remote controller is directed (aimed) at the computer body to control it only, without any control of the monitor's functions.

In addition, when installing a computer system, the monitor is situated in the immediate proximity of a user, e.g., on top of a desk or work space, since the information displayed thereon must be readily viewed. The computer body, on the other hand, is generally installed in an unobtrusive location, or at least out of reach, such that operation via a general (i.e., hand-held) remote controller is impractical. The computer mainframe may even be so remotely located as to render its remote control impossible using conventional means.

SUMMARY OF THE INVENTION

Accordingly, it is an object of the present invention to provide a remote-controlled monitor/PC control circuit for controlling a computer body (mainframe) or a monitor thereof, in which the monitor is controlled by receiving and processing a remote-control signal within the monitor itself and the computer is controlled using a PC communication port.

It is another object of the present invention to provide a method for remotely controlling the above circuit.

To achieve these and other advantages and in accordance with the purpose of the present invention, as embodied and broadly described, there is provided a PC body (mainframe) and monitor controlling circuit comprising: a remote controller for generating an optical remote control signal in according to a key input; an optical reception unit for converting the optical remote control signal output the remote controller into an electrical remote control signal; and a first microcomputer for controlling the PC body when the electrical remote control signal output the optical reception unit is a PC body control signal to control a sound output circuit and motion picture output circuit in the PC body and for controlling the monitor when an electrical remote control signal output the optical reception unit is a monitor control signal, to control Display Power Management System (DPMS) and On Screen Display (OSD) functions.

To achieve another aspect of the present invention, there is provided a method for remote-controlling a display monitor and a PC body, comprising the steps of: inputting a remote control signal using a remote controller; determining whether the input remote control signal is a PC body control signal or a monitor control signal; controlling the PC body if it is determined that the input remote control signal is a PC body control signal; and controlling the monitor if it is determined that the input remote control signal is a monitor control signal.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Figure 1:
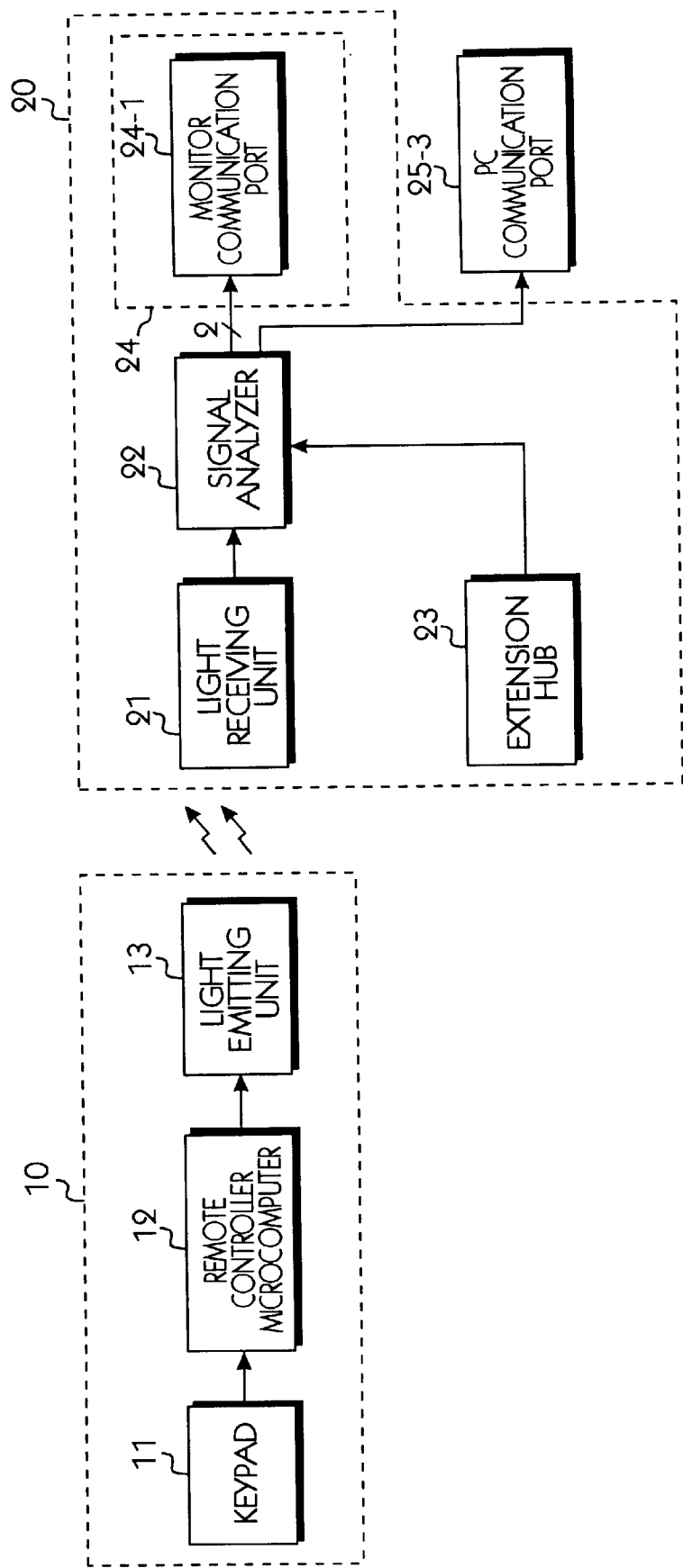
FIG. 1 is a block diagram showing a remote-controlled monitor/PC control block diagram according to the present invention.

Referring to FIG. 1, a remote-controlled monitor/PC control circuit according to the present invention largely comprises a remote controller 10 for remote-controlling a monitor and a PC mainframe by outputting a remote control signal; and a monitor 20 for receiving and processing the remote control signal output from the remote controller 10 and thereby generating monitor and PC control signals.

The remote controller 10 has a keypad 11 for generating a key signal according to the user-manipulation of the remote controller 10; a remote controller microcomputer 12 for receiving and encoding the key signal from the keypad 11 and outputting a remote control signal; and a light emitting unit 13 for converting the remote control signal into a light signal and outputting the light signal.

The monitor 20 has a light receiving unit 21 for receiving the light signal from the remote controller light emitting unit 13 in the remote controller 10 and converting the light signal into a current signal; an extension hub 23 for receiving an output signal from an input device (e.g., keyboard or mouse) and outputting the received extension hub signal; a signal analyzer 22 for analyzing the extension hub signal from the extension hub 23 and the current signal from the light receiving unit 21 and outputting monitor and PC control signals and an extension hub signal according to the result ofthe analysis; and a second microcomputer 24 for processing the PC control signal, monitor control signal and extension hub signal from the signal analyzer 22 for output. The second microcomputer 24 has a monitor communication port 24-1 for receiving the monitor control signal from the signal analyzer 22.

A PC mainframe (not shown) has a PC communication port 25-3 for receiving the PC control signal and extension hub signal from the signal analyzer 22.

In the operation of the above circuit, a user manipulates the keypad 11 to thereby generate a key signal for input to the remote controller microcomputer 12 which encodes the input key signal and outputs a remote control signal to the light emitting unit 13. The light emitting unit 13 converts the remote control signal into an infra-red light signal which is transmitted through the air to the light receiving unit 21 in the monitor 20 where the received light signal is converted into a current signal. The signal analyzer 22 receives and analyzes the current signal and the extension hub signal output from the extension hub 23 and outputs communication control signals.

The monitor communication port 24-1 in the second microcomputer 24 receives the monitor control signal from the signal analyzer 22 to control various circuit (not shown) in the monitor 20. For example, if the monitor control signal is a monitor screen horizontal size control signal, the horizontal size of the monitor screen is controlled, whereby the second microcomputer 24 receives horizontal and vertical sync signals and outputs the monitor screen control signal based on the resolution of a video mode.

The PC communication port 25-3 receives the PC control signal and the extension hub signal from the signal analyzer 22 and then applies these signals to the computer. After receiving the PC control signal and the extension hub signal, the computer controls internal circuits according to the received signals.

Figure 2:
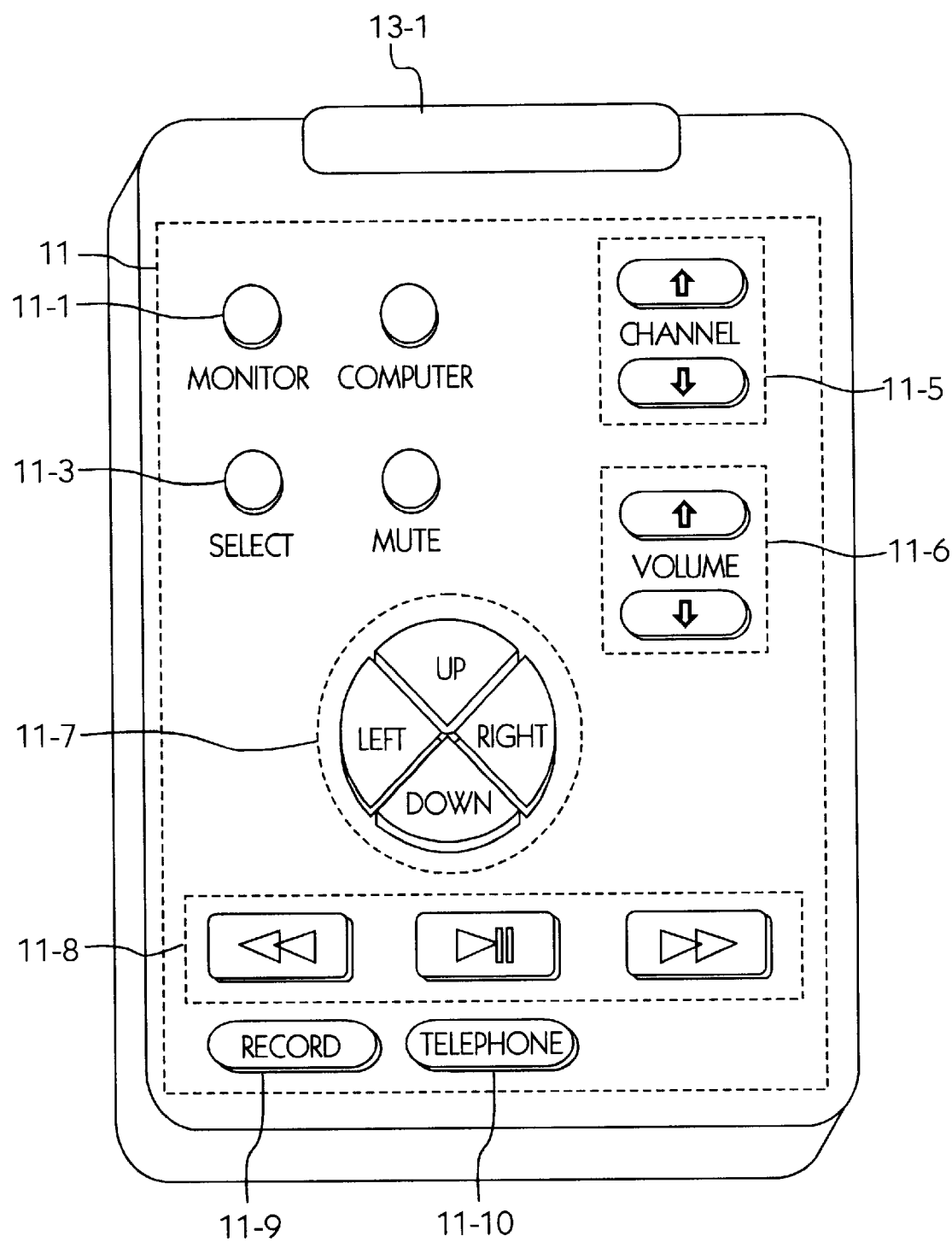
FIG. 2 is a perspective view ofthe exterior of one embodiment ofthe remote controller shown FIG. 1.

Referring to FIG. 2, which is a perspective view showing the outer appearance of the remote controller 10 in FIG. 1, the keypad 11 includes: a monitor selection key 11-1 for selecting monitor control; a PC selection key 11-2 for selecting PC control; an OSD screen selection key 11-3 for selecting displayed menu items; a mute key 11-4 for interrupting the output of the image signal and sound signal; up/down channel selection keys 11-5 for selecting channels when a television card is applied; up/down volume control keys 11-6 for controlling volume when a television or sound card is applied; cursor movement keys 11-7 for moving the cursor on the OSD screen; motion picture keys 11-8 for executing recorded video functions for MPEG mode applications; a record key 11-9 for recording input audio or displayed image signals; and a telephone function key 11-10 for selecting a telephone function when a modem is applied. A cover plate 13-1 is provided for covering a light emitting diode (not shown) for outputting the infra-red light signal generated by the light emitting unit 13.

Figure 3:
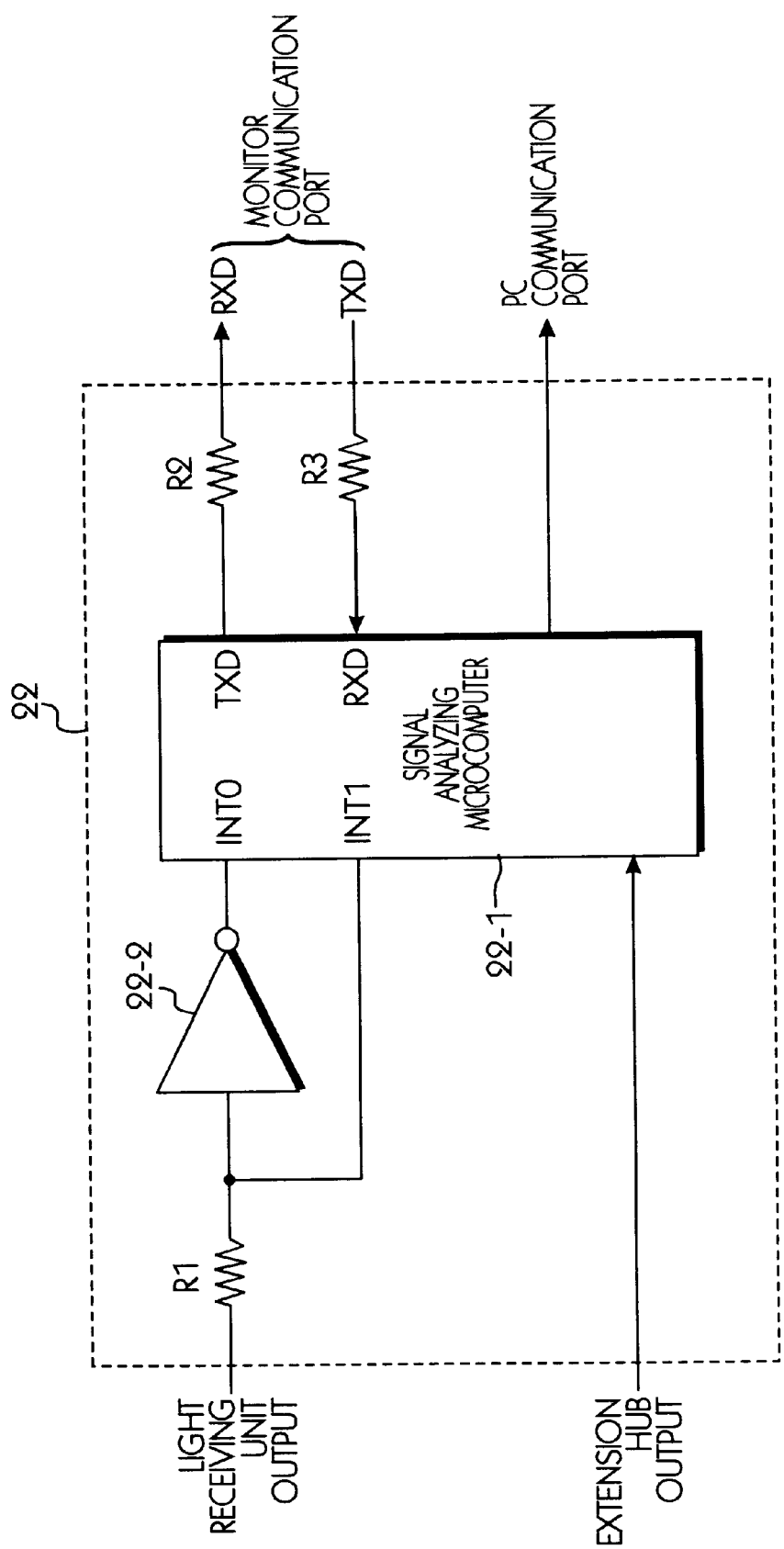
FIG. 3 is a circuit diagram of the signal analyzer of FIG. 1.

The signal analyzer 22, which receives the remote control signal generated by such a remote controller and analyzes the applied remote control signal, will be described in detail with reference to FIG. 3. The signal analyzer 22 comprises a signal analyzing microcomputer 22-1 which processes both the remote control signal received from the light emitting unit 21 and the extension hub signal from the extension hub 23; an inverter 22-2; and resistors R1-R3.

The output of the light receiving unit 21 is applied to an interrupt input INT1 of the signal analyzing microcomputer 22-1 via the resistor R1, while the inverted signal thereof is applied to an interrupt input INT0 via the inverter 22-2. The comparison of these two input signals in the signal analyzing microcomputer 22-1 can detect errors, thereby reducing the occurrence of errors due to the applied remote control signal. Further protection against errors is achieved by feeding the received monitor control, received at the data input RXD of the monitor communication port 24-1 and output through its data output TXD via data transmission resistors R2 and R3, back to the signal analyzing microcomputer 22-1.

The signal analyzing microcomputer 22-1 thus outputs the PC control signal, the monitor control signal, and the extension hub signal. The monitor communication port 24-1 receives monitor control signals and outputs the control signal for controlling a monitor function.

The PC control and extension hub signals, on the other hand, are applied from the signal analyzing microcomputer 22-1 via the PC communication port 25-3 to the computer (PC) mainframe, for controlling internal PC circuitry or software. For example, the PC control signal output from the signal analyzing microcomputer 22-1 could be a PC power off signal. The extension hub signal could be a keyboard or mouse output signal, whereby the signal analyzing microcomputer 22-1 analyzes the code of the applied key strokes or matrix input and the PC controls the circuits/ software accordingly.

Figure 4:
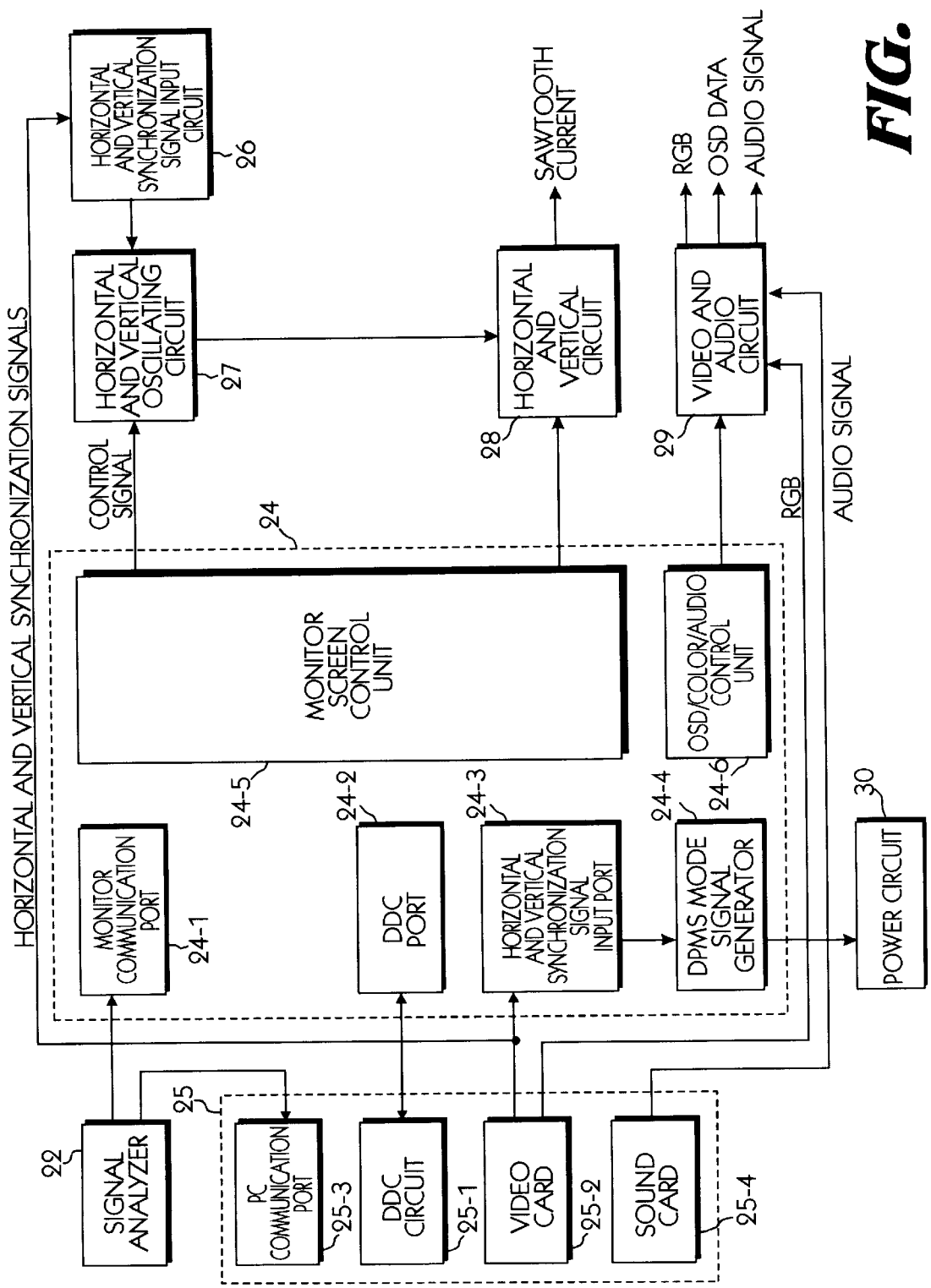
FIG. 4 is a detailed block diagram of a remote-controlled monitor/PC control circuit according to the present invention.

Referring to FIG. 4, a remote-controlled monitor/PC control circuit according to the present invention, comprises: the signal analyzing unit 22 for analyzing the remote control signal, determining whether the control signal is the monitor control signal or the PC control signal, and outputting the monitor control signal and the PC control signal according to the result of the analysis; the PC mainframe 25 for receiving and processing the PC control signal output from the signal analyzer 22, generating an RGB signal, and outputting the horizontal and vertical sync signals and audio signal; a second microcomputer 24 for receiving the monitor control signal and PC control signal from the signal analyzer 22 and the horizontal and vertical sync signals from the PC mainframe 25, and outputting the monitor screen control signal, an OSD control signal and a DPMS mode signal; a horizontal and vertical sync input circuit 26 for receiving and outputting the horizontal and vertical sync signals; a horizontal and vertical oscillating circuit 27 for receiving the horizontal and vertical sync signals from the horizontal and vertical sync input circuit 26 and the control signal from the second microcomputer 24, and outputting horizontal and vertical oscillating signals according to the received signals; a horizontal and vertical circuit 28 for receiving and processing the horizontal and vertical oscillating signals from the horizontal and vertical oscillating circuit 27 and the monitor screen control signal from the second microcomputer 24, and outputting a sawtooth current signal which synchronizes the image signals displayed on the monitor screen; a video and audio circuit 29 for receiving and processing the OSD data signal from the second microcomputer 24 and the RGB signal and audio signal from the PC mainframe 25, and outputting the RGB image and audio signal; and a power circuit 30 for receiving the DPMS mode signal from the second microcomputer 24, and managing power consumption according to the DPMS mode signal.

The PC mainframe 25, which receives the PC control signal from the signal analyzer 22, has a DDC circuit 25-1 for processing a DDC signal; a video card 25-2 for generating the horizontal and vertical sync signals and the RGB signal, and outputting the horizontal and vertical sync signals to synchronize the RGB signal; and a sound card 25-4 for generating audio information.

The second microcomputer 24 has a monitor communication port 24-1 for receiving the monitor control signal from the signal analyzer 22; a DDC port 24-2 for outputting the monitor DDC data to the DDC circuit 25-1 in the PC mainframe 25; a horizontal and vertical sync signal input port 24-3 for receiving the horizontal and vertical sync signals from the video card 25-2 in the PC mainframe 25; a DPMS mode signal generator 24-4 for generating a DPMS mode signal according to the horizontal and vertical sync signals output from horizontal and vertical sync signal input port 24-3 and outputting the DPMS mode signal; a monitor screen control unit 24-5 for receiving the monitor control signal and outputting the monitor screen control signal according to the received monitor control signal; and an OSD/color/audio control unit 24-6 for receiving the monitor control signal from the monitor communication port 24-1 and outputting the OSD signal according to the received monitor control signal.

In the operation of the circuit of FIG. 4, the remote controller 10 is manipulated to control the monitor or the PC, thus outputting a remote control signal. The signal analyzer 22 receives the output remote control signal and determines whether it is for PC control or monitor control. Monitor control signals are applied to the monitor communication port 24-1 in the second microcomputer 24, with monitor screen control signals being applied to the monitor screen control unit 24-5.

Meanwhile, the monitor screen control unit 24-5 applies a control signal to the horizontal and vertical oscillating circuit 27 which also receives the horizontal and vertical sync signals from the horizontal and vertical sync signal input circuit 26, to output horizontal and vertical signals to the horizontal and vertical circuit 28. To control the monitor screen, the monitor screen control unit 24-5 also outputs various monitor control signals such as a side-pin correction signal, a trapezoid correction signal, a parabolic correction signal, a horizontal phase control signal, a vertical line correction signal, a vertical size signal, a vertical center control signal, a horizontal size signal, an S-correction signal, and a degauss control signal.

If the monitor control signal received by the monitor communication port 24-1 is a monitor screen color signal, an OSD control signal or an audio signal, it is applied to the OSD/color/audio controller 24-6 which outputs OSD data, a monitor/television color control signal or an audio signal, as required. The video and audio circuit 29 receives the OSD data from the OSD/color/audio controller 24-6 and receives the RGB signal from the video card 25-2 and audio from the sound card 25-4 in the PC mainframe 25, and provides amplified outputs to a CRT and speakers (not shown). The CRT then selectively displays the received RGB signal and the OSD data according to the output from the remote controller 10.

For example, OSD selection signals from the remote controller 10 are applied to the video and audio circuit 29 via the second microcomputer 24. Then, the video and audio circuit 29 outputs the OSD image signal according to the received the OSD selection signal. The video and audio circuit 29 normally outputs the RGB signal if no OSD selection signal is applied.

The DPMS mode signal generator 24-4 determines if the horizontal and vertical sync signals are generated from the horizontal and vertical sync signal input port 24-3 and outputs the DPMS mode signal to the power circuit 30 according to the result of the determination. Then, the power circuit 30 saves the power consumed in the monitor according to the DPMS mode signal.

The DDC port 24-2 outputs DDC data to the DDC circuit 25-1 in the PC mainframe 25, according to monitor conditions. Then, the DDC circuit 25-1 receives the data on the monitor and processes the data for optimum conditions.

Thus, the PC mainframe 25 receives the PC control signal from the signal analyzer 22 and controls each circuit therein accordingly.

Figure 5:
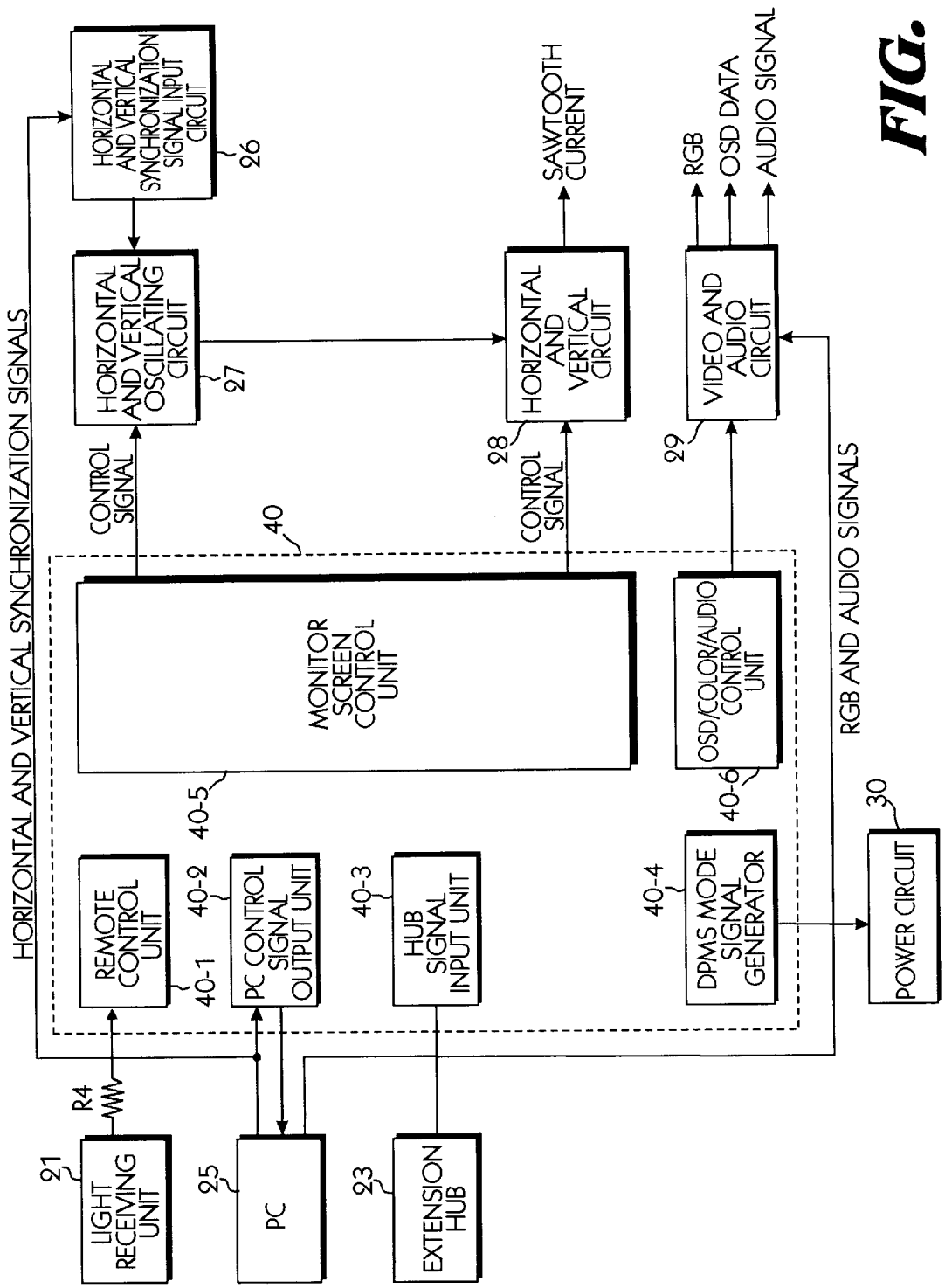
FIG. 5 is a detailed block diagram showing an embodiment of a remote-controlled monitor/PC control circuit according to the present invention.

FIG. 5 is a block diagram showing a monitor according to a preferred embodiment of the present invention. FIG. 5 shows a light receiving unit 21 for receiving the light signal according to the remote control signal applied from the remote controller and converting the light signal into a remote control signal; a PC mainframe 25 for generating horizontal and vertical sync signals to synchronize the image signal; an extension hub 23 for connecting an input device such a mouse or keyboard; a third microcomputer 40 for receiving and analyzing the output from the light receiving unit 21 and the extension hub signal from the extension hub 23, and outputting the monitor control signal and the PC control signal; a horizontal and vertical sync signal input circuit 26 for receiving and outputting the horizontal and vertical sync signals from the PC mainframe 25; a horizontal and vertical oscillating circuit 27 for receiving the horizontal and vertical sync signals from the horizontal and vertical sync signal input circuit 26 and the control signal from the third microcomputer 40, and outputting the horizontal and vertical oscillating signals; a horizontal and vertical circuit 28 for receiving the horizontal and vertical oscillating signals from the horizontal and vertical oscillating circuit 27 and the control signal from the third microcomputer 40 to control the monitor screen, and outputting sawtooth current accordingly; a video and audio circuit for receiving and outputting the OSD control signal, color control signal and audio control signal from the third microcomputer 40 and the RGB signal and audio signal from the PC mainframe 25; and a power circuit 30 for receiving the DPMS mode signal from the third microcomputer 40 and managing the monitor's power consumption.

The microcomputer 40 has a remote control unit 40-1 for receiving and analyzing the remote data signal from the light receiving unit 21, and outputting the monitor control signal and PC control signal; a PC control signal output unit 40-2 for receiving and outputting the PC control signal if the remote data signal output from the remote control unit 40-1 is the PC control signal; a hub signal input unit 40-3 for receiving, analyzing and outputting the extension hub signal from the extension hub 23; a DPMS mode signal generator 40-4 for receiving a DPMS enable signal according to the monitor control signal if the remote data signal is the monitor control signal, and outputting a DPMS mode signal to manage power consumption; a monitor screen control unit 40-5 for receiving the monitor screen control signal if the remote data signal is the monitor control signal, and outputting a control signal to control the monitor screen; and an OSD/color/audio controller 40-6 for receiving the OSD/color/audio control signals if the remote data signal is the monitor control signal and outputting an OSD signal, monitor/television color control signals and an audio control signal.

In the operation of the circuit according to FIG. 5, when the light receiving unit 21 receives a light signal from the remote controller 10, the received light signal is converted into a pulsed signal. The pulsed signal is applied to the remote control unit 40-1 via a fourth resistor R4, as a remote control data signal, where it is determined whether the signal is for monitor control or PC control.

If the PC control signal analyzed at the remote control unit 40-1 is a power-on signal, it is applied to the PC control signal output unit 40-2 and received by the PC mainframe 25. If the remote data signal analyzed at the remote control unit 40-1 is a software execution signal, the PC control signal output unit 40-2 receives a software execution command and applies it to the CPU (not shown) in the PC mainframe 25, to execute a program according to the software execution command.

If the remote data signal is the monitor control signal, the DPMS mode signal generator unit 40-4 receives the DPMS enable signal and enables the DPMS mode. When the DPMS mode is enabled, the third microcomputer 40 senses the horizontal and vertical sync signals applied from the PC mainframe 25. Then, he DPMS mode signal generator 40-4 applies the DPMS mode signal, e.g., a suspend mode signal, a standby mode signal and a power-off mode signal, to the power circuit 30 according to the sensing result of the horizontal and vertical sync signals and manages the power consumption of the monitor according to the DPMS mode.

If the remote data signal is a monitor screen control signal, it is applied to the monitor screen control unit 40-5 which outputs the various monitor screen control signals, as in the circuit of FIG. 4.

The horizontal and vertical sync signal input circuit 26, the horizontal and vertical oscillating circuit 27, and the horizontal and vertical circuit 28 operate in the same manner as described with respect to FIG. 4. Similarly, if the monitor control signal output from the remote control unit 40-1 is an OSD control signal, monitor/television color control signal or audio control signal, the OSD/color/audio control unit 40-6 operates in a manner corresponding to the circuit of FIG. 4; likewise with the video and audio circuit 29.

Meanwhile, the extension hub signal is applied from the extension hub 23 to the hub signal input unit 40-3 in the third microcomputer 40. Here, if the extension hub signal is a PC control signal, it is applied to the PC mainframe 25 via the PC control signal output unit 40-2 to control or execute the appropriate hardware or software. If the extension hub signal is a monitor control signal, it is applied to the monitor screen control unit 40-5 or to the OSD/color/audio control unit 40-6, to control the monitor.

The flow of the operation of the monitor and PC control circuit using the remote controller will be described with reference to FIG. 6.

Figure 6:
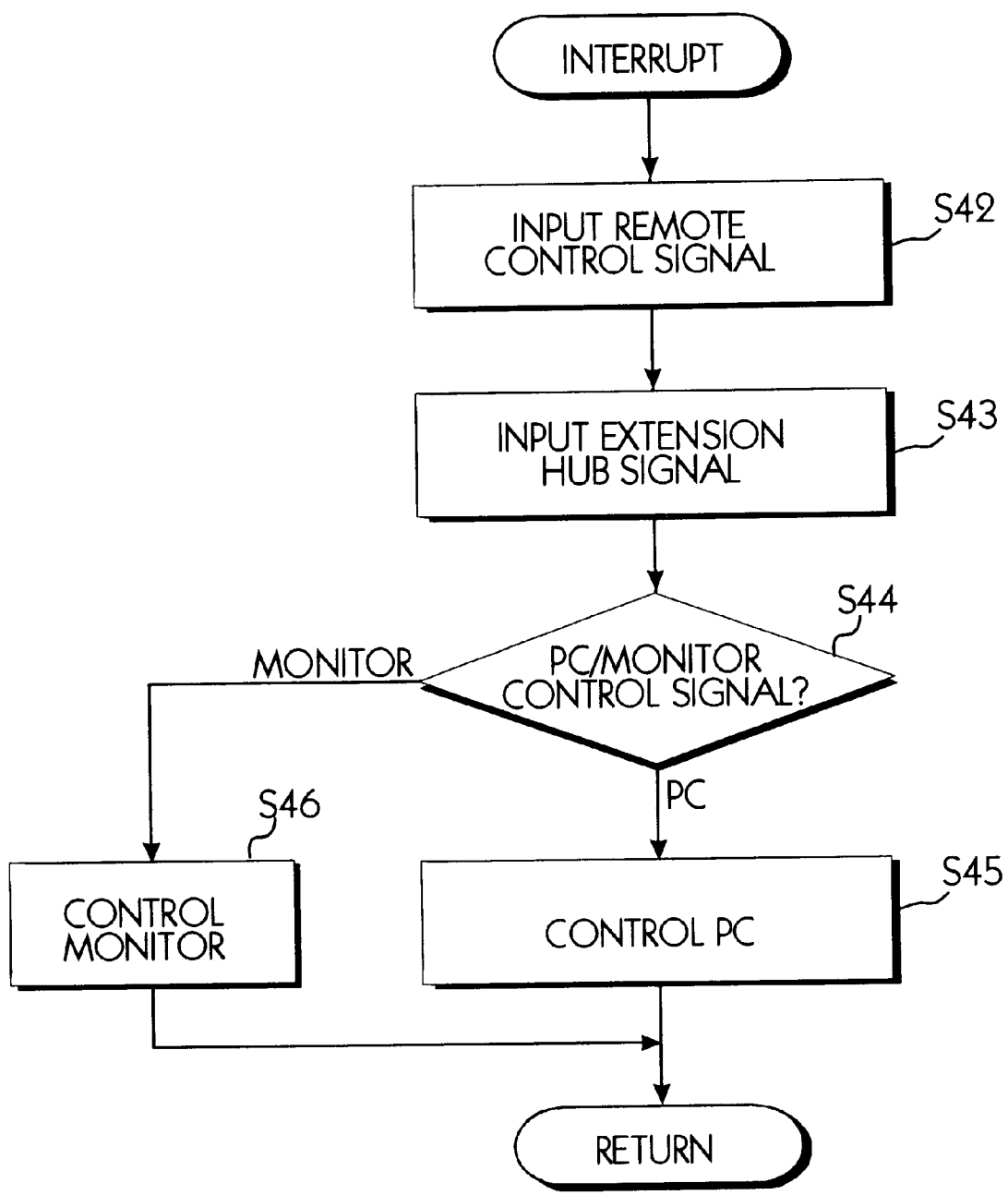
FIG. 6 is a flow chart showing a monitor/PC control method using a remote controller according to the present invention.

Referring to FIG. 6, a method of controlling the monitor and PC using a remote controller according to the present invention comprises: a step S42 of inputting the remote control signal using the remote controller 10; a step S43 of inputting the extension hub signal; a step S44 of determining whether the input signal is a PC control signal or a monitor control signal; a step S45 of controlling the PC according to the PC remote control signal, if it is determined that the input signal is a PC control signal; and a step S46 of controlling the monitor according to the monitor remote control signal, if it is determined that the input signal is a monitor control signal.

According to the above method, in step S42, a remote control signal is generated by manipulating the keypad 11 of the remote controller 10. Here, if the generated remote control signal output is the monitor/PC power-on signal and the PC and monitor are powered on, the extension hub signal is applied via the extension hub in step S43.

In step S44, it is determined whether the applied remote control signal is a monitor or PC control signal. If it is determined to be a PC control signal, the PC is controlled in step S45. If, on the other hand, it is determined to be a monitor control signal, the monitor is controlled in step S46.

As described above, the present invention enables free placement of a remote-controlled computer body, since the receiving unit of a remote controller is not installed in the computer body and is included in a representative display device of the computer. In addition, the present invention provides for the remote-control of the monitor as well as the computer body, using one remote controller.

It will be apparent to those skilled in the art that various modifications can be made in the remote-controlled monitor/PC control circuit of the present invention, without departing from the spirit of the invention. Thus, it is intended that the present invention cover such modifications as well as variations thereof within the scope of the appended claims and their equivalents.

What is claimed is:

1. A remote controlled computer system comprising:

a computer for performing data processing operations;

a monitor for displaying data output from said computer as a result of said data processing operations, said monitor comprising a remote control signal reception unit therein; and a remote controller for providing a remote control signal to said remote control signal reception unit in said monitor for selectively controlling either one of said computer and said monitor via said remote control signal reception unit in said monitor, said remote control signal reception unit comprising:

a light receiving unit for receiving said remote control signal as a light signal and converting said light signal to a current signal;

an extension hub for receiving an output signal from a computer peripheral device, said computer peripheral device being either one of a keyboard and a mouse, and outputting a hub signal;

a signal analyzer for analyzing the current signal and the hub signal and generating either one of a computer control signal and a monitor control signal for selectively controlling either one of said computer and said monitor, wherein said signal analyzer also outputs said hub signal;

a microprocessor for receiving and said computer control signal, said monitor control signal and said hub signal output from said signal analyzer, said microprocessor having a monitor communication port for receiving said monitor control signal generated by said signal analyzer; and said computer control signal generated by said signal analyzer and said hub signal output from said signal analyzer being supplied to a computer communication port of said computer.

2. The computer system as set forth in claim 1, said signal analyzer comprising:

a first resistor connected on one end to said light receiving unit to receive said current signal;

an inverter connected to another end of said first resistor for outputting an inverted current signal by inverting said current signal;

a signal analyzing microcomputer having a input for receiving said hub signal, a first interrupt port for receiving the inverted current signal, a second interrupt port for receiving said current signal via said first resistor, a first data output terminal for outputting said monitor control signal, a second data output terminal for outputting said computer control signal and said hub signal, and a data input terminal for receiving said monitor control signal which is fed back from said monitor communication port, said signal analyzing microcomputer performing error checking by comparing said current signal and said inverted current signal and by comparing said monitor control signal with said monitor control signal fed back to said data receiving terminal;

a second resistor serially connected between said first data output terminal and said monitor communication port; and a third resistor serially connected between said monitor communication port and said data receiving terminal.

3. The remote control system as set forth in claim 1, said remote controller comprising:

a keypad for outputting monitor control key signals and computer control key signals;

a remote controller microcomputer for encoding the monitor control key signals and computer control key signals output from the keypad to generate said remote control signal; and a light emitting unit for converting said remote control signal to said light signal.

4. The remote control system as set forth in claim 1, said microprocessor comprising:

a synchronization signal input port connected to receive horizontal and vertical synchronizing signals output from a video card of said computer;

a power mode signal generator responsive to the horizontal and vertical synchronizing signals input via said synchronization signal input port for generating a power mode signal for managing power consumption of said monitor by controlling a power circuit of said monitor;

a control unit responsive to said monitor control signal input via said monitor communication port for generating on-screen display control data, color control data or audio control data, said on-screen display control data, color control data or audio control data being provided to a video and audio circuit of said monitor for controlling the display of on-screen data, the display of color information received from said video card; and amplification of audio information received from a sound card of said computer; and a monitor screen control unit for receiving the monitor control signal via said monitor communication port and outputting a monitor screen control signal according to the received monitor control signal, said monitor screen control signal being provided to a horizontal and vertical oscillating circuit which also receives the horizontal and vertical synchronizing signals output from said video card and received via a horizontal and vertical sync signal input circuit to control a screen of said monitor, said monitor screen control signal being any of a side-pin correction signal, a trapezoid correction signal, a parabolic correction signal, a horizontal phase control signal, a vertical line correction signal, a vertical size signal, a vertical center control signal, a horizontal size signal, an S-correction signal, and a degauss control signal.

5. A remote controlled computer system comprising:
a computer for performing data processing operations;
a monitor for displaying data output from said computer as a result of said data processing operations; and
a remote controller for providing a remote control signal to said monitor for selectively controlling either one of said computer and said monitor, said monitor comprising:

light receiving unit for receiving said remote control signal as a light signal and converting said light signal to a pulsed signal;

a power circuit for controlling power to said monitor;

a horizontal and vertical synchronizing signal input circuit for receiving horizontal and vertical synchronizing signals output from said computer;

a horizontal and vertical oscillating circuit for generating horizontal and vertical oscillation signals;

a vertical and horizontal sync circuit responsive to said horizontal and vertical oscillation signals for generating a sawtooth current to control horizontal and vertical components of an image displayed on a screen of said monitor;

a video and audio circuit for receiving and outputting on-screen data, color information and sound information; and a microprocessor for generating control signals for controlling said power circuit, said horizontal and vertical oscillating circuit, said horizontal and vertical sync circuit, said video and audio circuit and said computer, in response to said pulsed signal.

6. The remote controlled computer system as set forth in claim 5, said microprocessor comprising:

a remote control unit responsive the pulsed signal for analyzing the remote control data and for outputting a monitor control signal and a computer control signal;

a computer control signal output unit for outputting said computer control signal to said computer;

a hub signal input unit for receiving, analyzing and outputting an extension hub signal from and extension hub;

a power mode signal generator responsive to the monitor control signal for generating a power mode signal for managing power consumption of said monitor by controlling said power circuit of said monitor, when said monitor control signal is indicative of said power mode signal;

a control unit responsive to said monitor control signal for generating on-screen display control data, color control data or audio control data, said on-screen display control data, color control data or audio control data being provided to said video and audio circuit of said monitor for controlling the display of on-screen data, the display of color information; and amplification of audio information, when said monitor control signal is indicative of said on-screen display control data, said color control data or said audio control data, respectively; and a monitor screen control unit for receiving the monitor control signal and outputting a monitor screen control signal to one of said horizontal and vertical oscillating circuit and said horizontal and vertical sync circuit when said monitor control signal is indicative of said monitor screen control signal, said monitor screen control signal being provided to said horizontal and vertical oscillating circuit to control synchronization of an image displayed on the screen of said monitor, or said monitor screen control signal being any of a side-pin correction signal, a trapezoid correction signal, a parabolic correction signal, a horizontal phase control signal, a vertical line correction signal, a vertical size signal, a vertical center control signal, a horizontal size signal, an S-correction signal, and a degauss control signal.

* * * * *